United States Patent [19]
Na

[11] Patent Number: 5,999,824
[45] Date of Patent: Dec. 7, 1999

[54] RADIO SIGNAL PROCESSING APPARATUS OF PORTABLE TELEPHONE FOR SHARING DIGITAL/ANALOG COMPATIBLE MODE AND PERSONAL COMMUNICATION SERVICE MODE

[75] Inventor: Bo-Gyu Na, Yongin, Rep. of Korea

[73] Assignee: Samsung Electronics Co., Ltd., Rep. of Korea

[21] Appl. No.: 08/985,713

[22] Filed: Dec. 5, 1997

[30] Foreign Application Priority Data

Dec. 6, 1996 [KR] Rep. of Korea ...................... 96/62418

[51] Int. Cl.$^6$ ............................... H04B 1/40; H04Q 7/32
[52] U.S. Cl. ............................. 455/553; 455/76; 455/77; 455/78
[58] Field of Search .................................. 455/75, 76, 77, 455/78, 83, 84, 86, 88, 180.1, 188.1, 553, 318

[56] References Cited

U.S. PATENT DOCUMENTS

| | | | |
|---|---|---|---|
| 5,020,092 | 5/1991 | Phillips et al. | 455/77 |
| 5,280,636 | 1/1994 | Kelley et al. | 455/180.1 |
| 5,437,051 | 7/1995 | Oto | 455/318 |
| 5,535,432 | 7/1996 | Dent | 455/77 |
| 5,564,076 | 10/1996 | Auvray | 455/76 |
| 5,722,053 | 2/1998 | Kornfeld et al. | 455/86 |
| 5,732,330 | 3/1998 | Anderson et al. | 455/76 |
| 5,809,405 | 9/1998 | Yamaura | 455/101 |
| 5,815,804 | 9/1998 | Newell et al. | 455/78 |
| 5,881,369 | 3/1999 | Dean et al. | 455/78 |

FOREIGN PATENT DOCUMENTS

| | | | |
|---|---|---|---|
| 0678974 | 10/1995 | European Pat. Off. | H03D 7/16 |
| 2310342 | 8/1997 | United Kingdom . | |

OTHER PUBLICATIONS

Combined Search and Examination Report Under Sections 17 and 18(3). "The Patent Office", Apr. 22, 1998.

*Primary Examiner*—Reinhard J. Eisenzopf
*Assistant Examiner*—Duc Nguyen
*Attorney, Agent, or Firm*—Dilworth & Barrese

[57] ABSTRACT

A radio signal processing apparatus of a portable telephone which can share a first transmit/receive mode such as a digital/analog (D/A) compatible mode and second transmit/receive mode such as a personal communication service (PCS) mode. The radio signal processing apparatus includes: a frequency generator for generating frequencies necessary for a frequency conversion; a first mode converter for converting a frequency of a signal transmitted and received in the first mode according to a prescribed oscillating frequency generated from the frequency generator; a second mode converter for converting a frequency of a signal transmitted and received in the second mode according to a prescribed oscillating frequency generated from the frequency generator; an intermediate frequency processor for converting, transmitting and receiving intermediate frequencies according to a prescribed oscillating frequency generated from the frequency generator; a first switch for selectively connecting an antenna to the first mode converter or the second mode converter; and a second switch for selectively connecting the first mode converter or the second mode converter to the intermediate frequency processor.

9 Claims, 3 Drawing Sheets

RADIO SIGNAL PROCESSING APPARATUS OF PORTABLE TELEPHONE FOR SHARING DIGITAL/ANALOG COMPATIBLE MODE AND PERSONAL COMMUNICATION SERVICE MODE

BACKGROUND OF THE INVENTION

1. Field of the Invention

The present invention relates to a radio signal processing apparatus of a portable telephone, and in particular, to a radio signal processing apparatus which can share a cellular digital/analog compatible mode and a personal communication service mode.

2. Description of the Related Art

A personal communication service (PCS) represents a mobile communication service involving a walker and provides a radio service within a service area by processing a portion of regionally fixed subscriber lines by radio. A walker may be a person who is slowly walking with a portable communication device in a mobile communication service. Thus, a mobile communication service involving a walker refers to a mobile communication service capable of communication with persons travelling (e.g., walking) at a relatively low speed condition.

To use a portable telephone in a digital/analog compatible mode, a radio signal processing apparatus has been proposed as shown in FIG. 1. The digital/analog compatible mode is a new standard (IS-95; TR-45) in which an analog system is compatible with a digital system. The digital/analog compatible standard IS-95 specifies that a frequency bandwidth assigned to an analog cellular telephone can be used in a code division multiple access (CDMA) digital system. Therefore, the radio signal processing apparatus of FIG. 1 can be used in both a digital system and an analog system. The receiving and transmitting frequency ranges used in the radio signal processing apparatus are 868.5–893.5 MHz and 823.5–848.5 MHz, respectively.

Referring to FIG. 1, the radio signal processing apparatus of the digital/analog compatible portable telephone includes a digital/analog compatible converter 110, an intermediate frequency (IF) signal processor 112 and an antenna 114. The digital/analog compatible converter 110 transmits or receives a signal in tune with a frequency band of 800 MHz. The IF signal processor 112 generates an IF signal used in the radio processing apparatus of the digital/analog compatible portable telephone or processes a signal transmitted to or received from the digital/analog compatible converter 110. The digital/analog compatible converter 110 which is tuned with the frequency band of 800 MHz includes a duplexer 116, a digital/analog compatible receiving signal converter 150 having a low-noise amplifier (LNA) 118, a band pass filter (BPF) 120, a receiving mixer 122 and a multiplier 124, and a digital/analog compatible transmitting signal converter 152 having a multiplier 126, a transmitting mixer 128, a band pass filter 130 and a power amplifier (PA) 132. The IF signal processor 112 has a receiving IF processor 134, a frequency generator 138 and a transmitting IF processor 136.

In operation, a receiving signal of the frequency band of 800 MHz received through the antenna 114 is transmitted to the low-noise amplifier 118 through the demultiplexer 116. The receiving signal is low-noise amplified through the low-noise amplifier 118 and band pass filtered through the band pass filter 120 having a pass band of 868.5–893.5 MHz. The output of the band pass filter 120 is mixed with a local oscillating signal through the receiving mixer 122.

The local oscillating signal is obtained by multiplying the frequency of an oscillating signal VCO generated from the frequency generator 138 of the IF signal processor 112 by one via a fundamental wave oscillating summing process performed in the multiplier 124. The oscillating signal VCO generated from the frequency generator 138 has an oscillating frequency f(VCO) of 953.88–978.88 MHz. The local oscillating signal generated from the multiplier 124 has the same frequency as the oscillating signal VCO generated from the frequency generator 138. Therefore, the receiving mixer 122 mixes the receiving signal having the frequency of 868.5–893.5 MHz with the local oscillating signal having the frequency of 953.88–978.88 MHz and generates an IF signal having the frequency of 85.38 MHz. The IF signal having the frequency of 85.38 MHz generated from the receiving mixer 122 is band pass filtered through a band pass filter 140 of the receiving IF processor 134 of the IF signal processor 112. The band pass filtered IF signal is gain-controlled through an automatic gain controller (AGC) 142. The gain-controlled IF signal is converted into an analog signal through a baseband signal converter 144 by a signal having the frequency of 170.76 MHz generated from the frequency generator 138 and then transmitted to a baseband signal processor.

The operation for transmitting a transmitting IF signal is performed in reverse order. A baseband signal converter 148 of the transmitting IF processor 136 converts a baseband analog signal received from the baseband signal processor into the transmitting IF signal by using a signal having the frequency of 19.68 MHz generated from the frequency generator 138 and a signal of the frequency of 260.76 MHz which the converter 148, itself, generates. The transmitting IF signal is gain-controlled through an automatic gain controller 146 and generated as an IF signal having the frequency of 130.38 MHz. The IF signal having the frequency of 130.38 MHz is transmitted to the transmitting mixer 128 of the digital/analog compatible converter 110. The transmitting mixer 128 mixes the IF signal having the frequency of 130.38 MHz with a local oscillating signal of the frequency of 953.88–978.88 MHz generated from the multiplier 126 and generates a transmitting signal having the frequency of 823.5–848.5 MHz. The local oscillating signal is generated through the same process as the local oscillating signal used in the receiving mixer 122 and will therefore not be described in detail herein. The transmitting signal is band pass filtered through the band pass filter 130 having the pass band of 823.5–848.5 MHz and power-amplified through the power amplifier 132. The power-amplified transmitting signal is transmitted to the duplexer 116 and radiated through the antenna 114.

As described above, the receiving and transmitting frequency ranges used in the digital/analog compatible portable telephone are 868.5–893.5 MHz and 823.5–848.5 MHz, respectively. However, the receiving and transmitting frequency ranges used in the PCS portable telephone are 1840–1870 MHz and 1750–1780 MHz, respectively. Since there is a great difference in the receiving and transmitting frequency ranges between the PCS portable telephone and the digital/analog compatible portable telephone, it is difficult to share the radio signal processing apparatus. That is, the frequency receiving and transmitting frequency ranges used in the PCS portable telephone are twice or more than the receiving and transmitting frequency ranges used in the digital/analog compatible portable telephone.

Accordingly, it would be highly desirable to provide a portable telephone having respective radio signal processing apparatus which can share the frequency band used in the digital/analog compatible mode and the PCS mode.

SUMMARY OF THE INVENTION

It is an object of the present invention to provide a radio signal processing apparatus which can share a digital/analog compatible mode and a PCS mode.

According to one aspect of the present invention, a radio signal processing apparatus of a portable telephone which can share a first transmit/receive mode, such as a digital/analog compatible mode, and second transmit/receive mode, such as a personal communication service mode, includes: a frequency generator for generating frequencies necessary for a frequency conversion; a first mode converter for converting a frequency of a signal transmitted and received in the first mode according to a prescribed oscillating frequency generated from the frequency generator; a second mode converter for converting a frequency of a signal transmitted and received in the second mode according to a prescribed oscillating frequency generated from the frequency generator; an intermediate frequency processor for converting, transmitting and receiving intermediate frequencies according to a prescribed oscillating frequency generated from the frequency generator; a first switch for selectively connecting an antenna to the first mode converter or the second mode converter according to a mode selection of a user; and a second switch for selectively connecting the first mode converter or the second mode converter to the intermediate frequency processor according to a mode selection of a user.

These and other objects, features and advantages of the present invention will become apparent from the following detailed description of illustrative embodiments thereof, which is to be read in connection with the accompanying drawings, in which like reference symbols indicate the same or similar components.

DETAILED DESCRIPTION OF PREFERRED EMBODIMENTS

With a trend toward multi-function complex systems in mobile radio communication products, a new terminal which combines a cellular portable telephone using a frequency band of about 800–900 MHz with a PCS portable telephone using the frequency band of about 1.8 GHz is needed. Moreover, as electronic products have shown a tendency toward reducing their size, a small-sized terminal which can share a digital/analog compatible mode and a PCS mode is also needed. The present invention addresses and satisfies such demands, as will be described herein. It is to be appreciated that in a portable telephone which uses different frequencies and shares two modes, as in the present invention, most components, except the components of the radio signal processing apparatus, can be shared. Therefore, in order to achieve a small-sized portable telephone, it is important to reduce the size of the radio signal processing apparatus for detecting and reproducing the different frequencies.

In accordance with the present invention, a preferred construction and operation of a small-sized radio signal processing apparatus of a portable telephone will now be described in detail.

Figure 1:
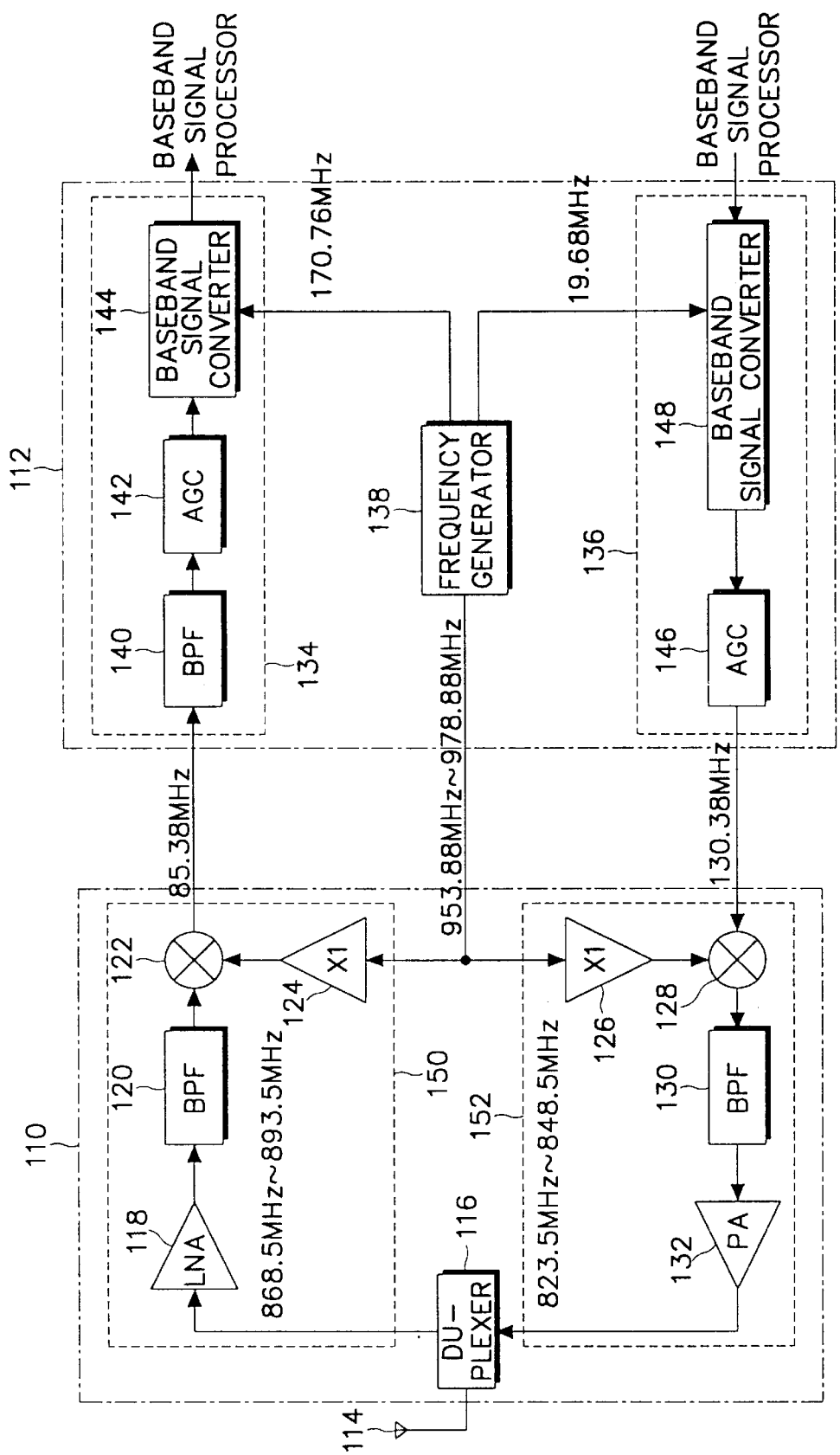
FIG. 1 is a block diagram of a conventional radio signal processing apparatus of a digital/analog compatible portable telephone.
Figure 2:
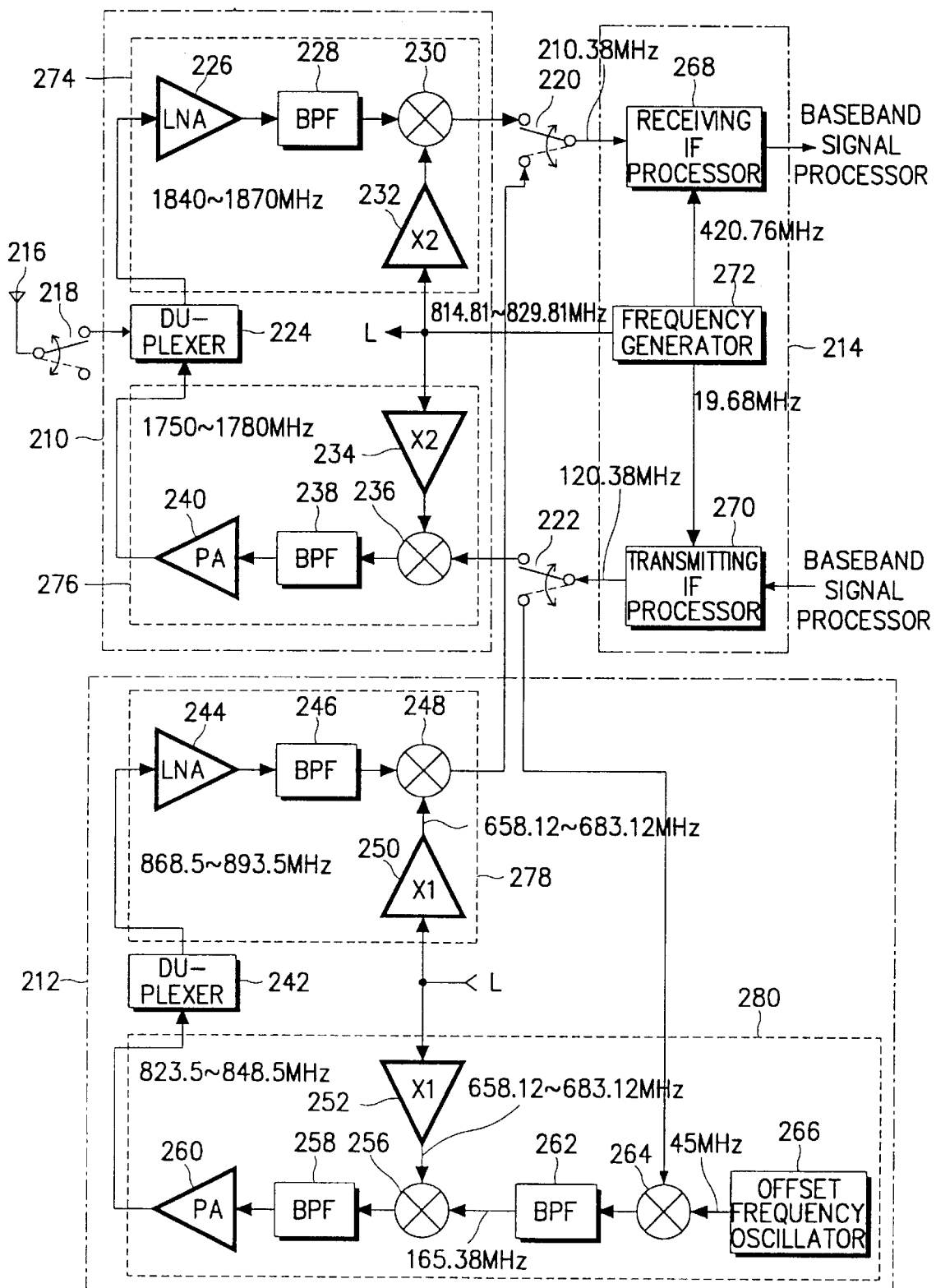
FIG. 2 is a block diagram of a radio signal processing apparatus for sharing a digital/analog compatible mode and a PCS mode according to a preferred embodiment of the present invention.

Referring to FIG. 2, a radio signal processing apparatus of the present invention includes a PCS converter 210, a digital/analog compatible converter 212, an IF signal processor 214, an antenna 216, and switches 218, 220 and 222. The PCS converter 210 transmits or receives a signal transmitted or received when using a PCS in tune with a frequency band of about 1.8 GHz. The digital/analog compatible converter 212 transmits or receives a signal transmitted or received when using a cellular communication system in tune with a frequency band of about 800 MHz. The IF signal processor 214 generates an IF signal used in the radio signal processing apparatus of the portable telephone which can share a digital/analog compatible mode and a PCS mode. The IF signal processor 214 also processes signals transmitted to and received from the PCS converter 210 and the digital/analog compatible converter 212. The switches 218, 220 and 222 connect lines in accordance with a user's demand. The first switch 218 selectively connects the antenna 216 to the PCS converter 210 and the digital/analog compatible converter 212. The second switch 220 selectively transmits a receiving IF signal generated from the PCS converter 210 or a receiving IF signal generated from the digital/analog compatible converter 212 to a receiving IF input terminal of the IF signal processor 214. The third switch 222 selectively transmits a transmitting IF signal generated from the IF signal processor 214 to a transmitting IF input terminal of the PCS converter 210 or of the digital/analog compatible converter 212.

The PCS converter 210 tuned with the frequency band of about 1.8 GHz includes a duplexer 224, a PCS receiving signal converter 274 having a low-noise amplifier (LNA) 226, a band pass filter (BPF) 228, a receiving mixer 230 and a multiplier 232, and a PCS transmitting signal converter 276 having a multiplier 234, a transmitting mixer 236, a band pass filter 238 and a power amplifier (PA) 240. The digital/analog compatible converter 212 tuned with the frequency band of about 800 MHz includes a duplexer 242, a digital/analog compatible receiving signal converter 278 having a low-noise amplifier 244, a band pass filter 246, a receiving mixer 248 and a multiplier 250, and a digital/analog compatible transmitting signal converter 280 having a multiplier 252, a transmitting mixer 256, a power amplifier 260, a mixer 264, band pass filters 258 and 262 and an offset frequency oscillator 266. The IF signal processor 214 consists of a receiving IF processor 268, a frequency generator 272, and a transmitting IF processor 270.

The transmitting/receiving operation performed when the user selects the PCS mode will now be described in detail.

If the PCS mode is selected, the first switch 218 is switched to connect the antenna 216 to the PCS converter 210. A receiving signal of the frequency band of about 1.8 GHz is received through the antenna 216 and is transmitted to the duplexer 224 of the PCS converter 210 and low-noise amplified through the low-noise amplifier 226. The amplified signal is band pass filtered through the band pass filter 228 having a pass band of about 1840–1870 MHz. The output of the band pass filter 228 is mixed with a local oscillating signal through the receiving mixer 230. The local oscillating signal is obtained by doubling the frequency of an oscillating signal VCO generated by the frequency generator 272 of the IF signal processor 214 through the multiplier 232. The oscillating signal VCO generated by the frequency generator 272 has an oscillating frequency f(VCO) of about 814.81–829.81 MHz. Therefore, the local oscillating signal generated from the multiplier 232 has a frequency f(LO) of about 1629.62–1659.62 MHz. The receiving mixer 230 generates a signal having a difference frequency between the receiving signal and the local oscillating signal. That is, the receiving mixer 230 mixes the receiving signal having the frequency band of about 1840–1870 MHz with the local oscillating signal having the frequency band of about 1629.62–1659.62 MHz and generates an IF signal having the frequency of about 210.38 MHz. The second switch 220 is switched to connect the PCS converter 210 to the IF signal processor 214 by the selection of the PCS mode. Therefore, the IF signal having the frequency of about 210.38 MHz generated from the receiving mixer 230 is transmitted to the receiving IF processor 268 of the IF signal processor 214. The IF signal transmitted to the receiving IF processor 268 is band pass filtered, gain-controlled, converted into an analog signal by a signal having a frequency of about 420.76 MHz generated from the frequency generator 272, and transmitted to a baseband signal processor.

The operation for transmitting a transmitting IF signal is performed in reverse order. The transmitting IF processor 270 converts a baseband analog signal received from the baseband signal processor into the transmitting IF signal by using a signal having a frequency of about 19.68 MHz generated from the frequency generator 272 and a signal of a frequency of about 240.76 MHz which the processor 270 generates itself. The transmitting IF signal is gain-controlled and generated as an IF signal having a frequency of about 120.38 MHz. The third switch 222 is switched to connect the transmitting IF processor 270 of the IF signal processor 214 to the PCS converter 210. Hence, the IF signal having the frequency of about 120.38 MHz generated from the transmitting IF processor 270 is transmitted to the transmitting mixer 236 of the PCS converter 210. The IF signal is mixed with a local oscillating signal through the transmitting mixer 236. The local oscillating signal is obtained by doubling the frequency of the oscillating signal VCO generated from the frequency generator 272 of the IF signal processor 214 through the multiplier 234. The oscillating signal VCO generated from the frequency generator 272 has an oscillating frequency f(VCO) of about 814.81–829.81 MHz. Therefore, the local oscillating signal generated from the multiplier 234 has a frequency f(LO) of about 1629.62–1659.62 MHz. The transmitting mixer 236 generates a signal having the sum frequency of the transmitting IF signal and the local oscillating signal. That is, the transmitting mixer 236 mixes the transmitting IF signal having a frequency of about 120.38 MHz with the local oscillating signal having a frequency of about 1629.62–1659.62 MHz and generates the transmitting signal having a frequency of about 1750–1780 MHz. The transmitting signal is band pass filtered through the band pass filter 238 having a pass band of about 1750–1780 MHz and then power-amplified through the power amplifier 240. The output of the power amplifier 240 is transmitted to the duplexer 224. The signal transmitted to the duplexer 224 is transmitted to the antenna 216 via the first switch 218 and radiated through the antenna 216.

The transmitting/receiving operation performed when the user selects the digital/analog cellular mode will now be described in detail.

If the digital/analog cellular mode is selected, the first switch 218 is switched to connect the antenna 216 to the digital/analog compatible converter 212. A receiving signal of a frequency band of about 800 MHZ received through the antenna 216 is transmitted to the duplexer 242 of the digital/analog compatible converter 212 and low-noise amplified through the low-noise amplifier 244. The amplified signal is band pass filtered through the band pass filter 246 having a pass band of about 868.5–893.5 MHz. The output of the band pass filter 246 is mixed with a local oscillating signal through the receiving mixer 248. The local oscillating signal is obtained by multiplying the frequency of the oscillating signal VCO generated from the frequency generator 272 of the IF signal processor 214 by one via the multiplier 250. The oscillating signal frequency f(VCO) of about 814.81–829.81 MHz is changed to an oscillating signal frequency f(VCO2) of about 658.12–683.12 MHz by a resonance circuit shown in FIG. 3. The resonance circuit is preferably included in multiplier 250.

Figure 3:
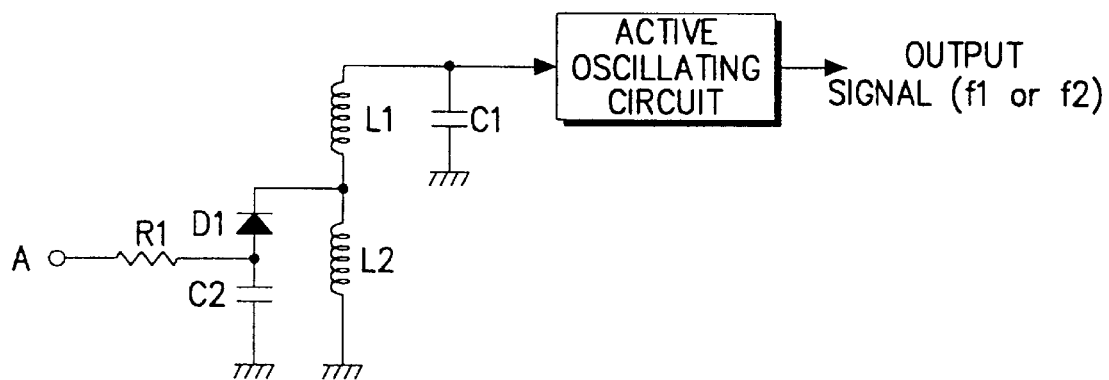
FIG. 3 shows a general oscillating circuit including an oscillating band resonator.

Referring to FIG. 3, there is illustrated an example for changing the oscillating signal frequency f(VCO) of about 814.81–829.81 MHz to f(VCO2) of about 658.12–683.12 MHz. FIG. 3 is a known technique and shows an oscillating circuit including an oscillating band resonator. If a signal A of logic "high" is supplied, a diode D1 is turned on. If a capacitor C2 has a very large capacitance, a node N becomes nearly ground state since an impedance is negligible with respect to an alternating current (AC) signal of the frequency to be oscillated. Therefore, an inductor L2 is disregarded. The resonator with a substantial construction consisting of an inductor L1 and a capacitor C1 is resonated to a frequency f1 expressed as:

$$f1 = \frac{1}{2\pi\sqrt{L1 \times C1}} \qquad (1)$$

If the signal A of logic "low" is supplied, the diode D1 is turned off. Then a circuit toward the capacitor C2 is opened and the node N is not in an AC ground state. The resonator is substantially constructed with the inductors L1 and L2 and the capacitor C1 and resonated to a frequency f2 expressed as:

$$f2 = \frac{1}{2\pi\sqrt{(L1 + L2) \times C1}} \qquad (2)$$

Therefore, two difference frequencies can be generated by the oscillating circuit including the oscillating band resonator of FIG. 3.

The oscillating signal generated from the frequency generator 272 has the frequency of about 658.12–683.12 MHz, and the local oscillating signal generated from the multiplier 250 also has the frequency of about 658.12–683.12 MHz. The receiving mixer 248 mixes the receiving signal having a frequency of about 868.5–893.5 MHz with the local oscillating signal having a frequency of about 658.12–683.12 MHz and generates the IF signal having a frequency of about 210.38 MHz. The second switch 220 is switched to connect the digital/analog compatible converter 212 to the IF signal processor 214 by the selection of the digital/analog cellular mode. Therefore, the IF signal having the frequency of about 210.38 MHz generated from the receiving mixer 248 is transmitted to the receiving IF processor 268 of the IF signal processor 214. The IF signal transmitted to the receiving IF processor 268 is processed in an identical manner as that described with respect to the operation implemented in the PCS mode.

Meanwhile, the transmitting operation of the transmitting IF processor 270 performed in the digital/analog cellular mode is identical to that carried out in the PCS mode. The third switch 222 is switched to connect the transmitting IF processor 270 of the IF signal processor 214 to the digital/analog compatible converter 212. Hence, the IF signal having the frequency of about 120.38 MHz generated from the transmitting IF processor 270 is transmitted to the mixer 264 of the digital/analog compatible converter 212. The mixer 264 mixes the transmitted IF signal with the output of the offset frequency oscillator 266 and generates a transmitting IF signal necessary for the digital/analog cellular mode. The IF signal transmitted through the third switch 222 has a frequency of about 120.38 MHz and the output of the offset frequency oscillator 266 has a frequency of about 45 MHz. The transmitting IF frequency signal generated from the mixer 264 has a frequency of about 165.38 MHz. The transmitting IF signal generated from the mixer 264 is band pass filtered through the band pass filter 262 and mixed with a local oscillating signal through the transmitting mixer 256. The local oscillating signal is obtained through the same process as the signal used in the receiving mixer 248. The transmitting mixer 256 mixes the transmitting IF signal having the frequency of about 165.38 MHz with the local oscillating frequency of about 658.12–683.12 MHz and generates a transmitting signal having the frequency of about 823.5–848.5 MHz. The transmitting signal generated from the transmitting mixer 256 is band pass filtered through the band pass filter 258 having a pass band of about 823.5–848.5 MHz and power-amplified through the power amplifier 260. The output of the power amplifier 260 is transmitted to the duplexer 242. The signal transmitted to the duplexer 242 is transmitted to the antenna 216 via the first switch 218 and radiated through the antenna 216.

Consequently, since a common part of the radio signal processing apparatus is shared and the local oscillating signal generated from the frequency generator is used by extracting different multiplying components, a small-sized portable telephone which can share the digital/analog compatible mode and the PCS mode is advantageously provided by the present invention, as described herein.

It is to be appreciated that the frequency ranges described herein are for exemplary purposes only and, thus, the present invention encompasses radio signal processing apparatus which permits shared operations between other transmit/receive modes operating in other frequency ranges.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A radio signal processing apparatus of a portable telephone which can share a first transmit/receive mode and a second transmit/receive mode, comprising:
    a frequency generator for generating frequencies necessary for a frequency conversion;
    a first mode converter for converting a frequency of a signal transmitted and received in said first mode according to a prescribed oscillating frequency generated from said frequency generator;
    a second mode converter for converting a frequency of a signal transmitted and received in said second mode according to a prescribed oscillating frequency generated from said frequency generator;
    an intermediate frequency processor for converting, transmitting and receiving intermediate frequencies according to a prescribed oscillating frequency generated from said frequency generator;
    a first switch for selectively connecting an antenna to one of said first mode converter and said second mode converter according to a mode selection of a user; and
    a second switch for selectively connecting one of said first mode converter and said second mode converter to said intermediate frequency processor according to a mode selection of a user.

2. The apparatus of claim 1, wherein the first mode is a digital/analog compatible mode and the second mode is a personal communication service mode.

3. The apparatus of claim 2, wherein said digital/analog compatible converter comprises:
    a first duplexer for transmitting or receiving a signal to and from said first switch;
    a digital/analog compatible receiving signal converter for converting a signal received through said first duplexer into an intermediate frequency signal according to a prescribed oscillating frequency generated from said frequency generator; and
    a digital/analog compatible transmitting signal converter for converting an intermediate frequency signal received through said second switch into a transmitting signal according to a prescribed oscillating frequency generated from said frequency generator.

4. The apparatus of claim 3, wherein said personal communication service converter comprises:
    a second duplexer for transmitting or receiving a signal to and from said first switch;
    a personal communication service receiving signal converter for converting a signal received through said second duplexer into an intermediate frequency signal according to a prescribed oscillating frequency generated from said frequency generator; and
    a personal communication service transmitting signal converter for converting an intermediate frequency signal received through said second switch into a transmitting signal according to a prescribed oscillating frequency generated from said frequency generator.

5. The apparatus of claim 4, wherein said second switch comprises:
    a switch for selectively connecting one of said digital/analog compatible receiving signal converter and said personal communication service receiving signal converter to said intermediate frequency processor according to a mode selection of a user; and
    another switch for selectively connecting one of said digital/analog compatible transmitting signal converter and said personal communication service transmitting signal converter to said intermediate frequency processor according to a mode selection of a user.

6. The apparatus of claim 4, wherein said personal communication service receiving signal converter comprises:
    a second low-noise amplifier for low-noise amplifying a receiving signal;
    a fourth band pass filter for filtering the low-noise amplified signal to a prescribed pass frequency band;
    a third multiplier for doubling a prescribed oscillating frequency generated from said frequency generator and generating a local oscillating signal; and
    a fourth mixer for mixing a signal filtered through said fourth band pass filter with said local oscillating signal generated from said third multiplier and generating an intermediate frequency signal.

7. The apparatus of claim 6, wherein said personal communication service transmitting signal converter comprises:
- a fourth multiplier for doubling a prescribed oscillating frequency generated from said frequency generator and generating a local oscillating signal; and
- a fifth mixer for mixing an intermediate frequency signal supplied through said second switch from said intermediate frequency processor with said local oscillating signal generated from said fourth multiplier and generating a transmitting signal;
- a fifth band pass filter for filtering said transmitting signal generated from said fifth mixer to a prescribed pass frequency band; and
- a second power amplifier for power-amplifying a signal generated from said fifth band pass filter and generating the power-amplified signal through said second duplexer.

8. The apparatus of claim 2, wherein said digital/analog compatible receiving signal converter comprises:
- a first low-noise amplifier for low-noise amplifying a receiving signal;
- a first band pass filter for filtering the low-noise amplified signal to a prescribed pass frequency band;
- a first multiplier for multiplying a prescribed oscillating frequency generated from said frequency generator by one and generating a local oscillating signal; and
- a first mixer for mixing the filtered signal with said local oscillating signal and generating an intermediate frequency signal.

9. The apparatus of claim 8, wherein said digital/analog compatible transmitting signal converter comprises:
- a second multiplier for multiplying an oscillating frequency generated from said frequency generator by one and generating a local oscillating signal;
- an oscillating for oscillating a prescribed frequency;
- a second mixer for mixing an intermediate frequency signal supplied through said second switch from said intermediate frequency processor with an oscillating signal generated from said oscillator;
- a second band pass filter for filtering a signal generated from said second mixer to a prescribed pass frequency band;
- a third mixer for mixing said local oscillating signal generated from said second multiplier with a signal generated from said second band pass filter and generating a transmitting signal;
- a third band pass filter for filtering said transmitting signal generated from said third mixer to a prescribed pass frequency band; and
- a first power amplifier for power-amplifying a signal generated from said third band pass filter and generating the power-amplified signal through said first duplexer.

* * * * *